3,300,777
VISUAL IDENTIFICATION OF AIRCRAFT
Richard James Clifford Tarr, Lytham St. Annes, England, assignors to British Aircraft Corporation ("E" Nominees) Limited
Filed Oct. 26, 1964, Ser. No. 406,327
Claims priority, application Great Britain, Oct. 28, 1963, 42,504/63
4 Claims. (Cl. 343—6)

Flights of aircraft which have no apparent correlation with scheduled operations are suspect and are generally investigated by interception. The crew of the intercepting aircraft have to identify the intruder by visual inspection, a difficult task made more difficult by increases in operating speeds. Time will not be available for flying into position behind the intruding aircraft and it will have to be identified from a passing distance which allows time for positive recognition. In cases involving supersonic aircraft these distances are of the order of several miles.

According to the present invention an angularly adjustable plane reflector is arranged to reflect radiation passing through a window in the airframe, and the aircraft includes tracking equipment for following the course of the object to be identified and for steering the reflector through an angle which is one-half of the angular movement of the object relative to the aircraft, so that the reflected beam is directed along a fixed path relative to the airframe; a telescope having its optical axis coincident with the fixed radiation path established by the plane reflector focuses the image on to the photo-cathode of an electronic camera tube. A receiver connected by a closed circuit television link may be arranged for observation within the craft.

The image presented to the television camera may be an infra-red image and this of course has the advantage that the observing system is suitable for night flying as well as daylight flying. The tracking equipment may be a radar or infra-red search and track system of known kind which will seek out the aircraft to be identified and then track this aircraft for a sufficient period to enable reliable observation to be carried out.

The use of an optically flat window in the airframe instead of observation domes is desirable, since it enables a sharply focused image to be produced and also presents less of an aerodynamic problem. If conventional aircraft are to be observed these windows may be arranged in the sides of the craft. If the craft is to observe satellites the windows will be on top.

Figure 1:
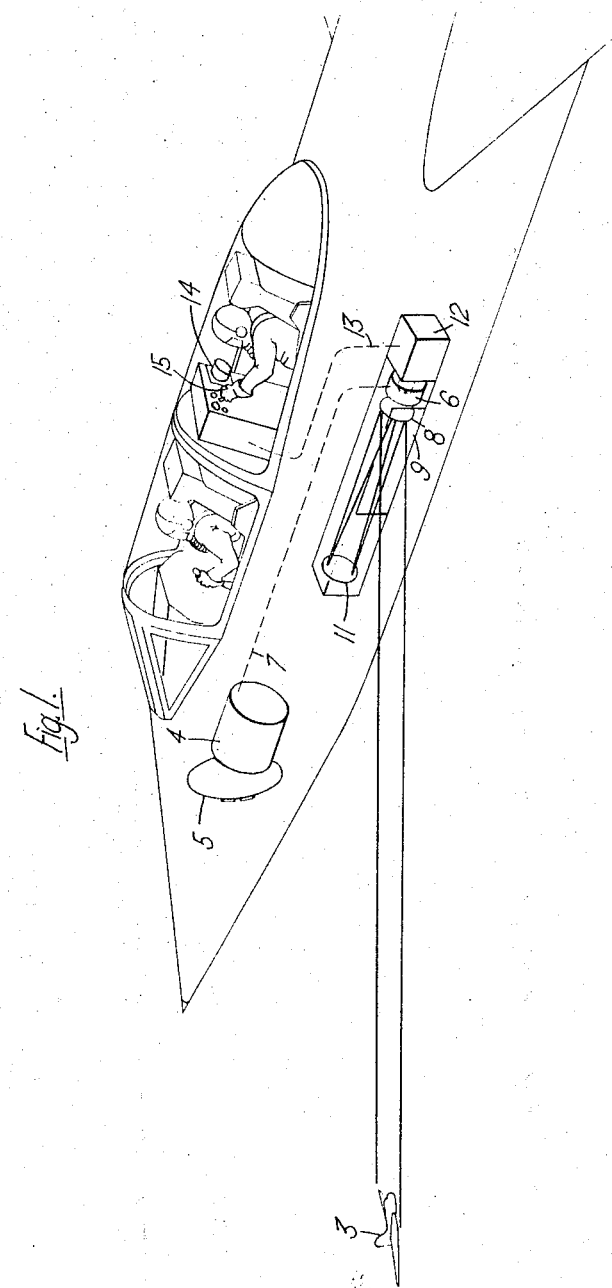
Figure 2:
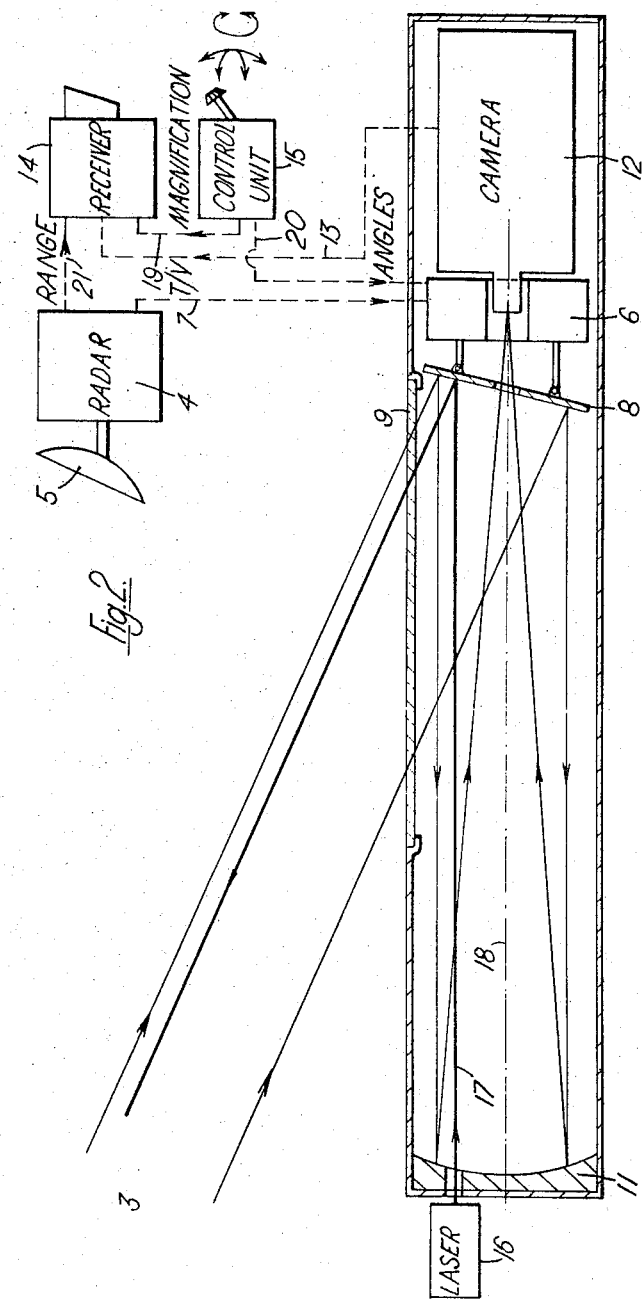

In order that the invention may be better understood two examples will now be described with reference to the accompanying drawings, in which:

FIGURE 1 shows diagrammatically a typical arrangement of the inspecting parts in an aircraft; and FIGURE 2 shows diagrammatically an alternative form of inspecting apparatus.

In FIGURE 1, the object or target 3, which in this case is an aircraft, is detected by the airborne radar 4 which, in the tracking mode, will have its scanner 5 pointing at the target. The servomechanism 6 receives from the radar 4 by way of line 7 signals which cause the servomechanism to drive a plane mirror 8, which is angularly adjustable about two mutually perpendicular axes, through angles which are one-half of the angular displacement of the object relative to the airframe, so that the reflected beam follows a path which is fixed with respect to the airframe. Thus the mirror gathers visible and infra-red radiation arriving through a side window 9 from the direction of the target, and reflects it along the fixed path which leads to the telescope objective 11, which in this case is a parabolic mirror. The beam of virtually parallel rays becomes convergent on reflection from this second mirror and passes through holes in the center of the plane mirror 8 and servo-mechanism 6 to form an image of the target at the focal point of the parabolic mirror. Optical magnification at this stage is optional and the rays may be focused directly on to the photo-cathode of a Vidicon camera 12. By means of a closed circuit television link 13 the image is reproduced on a cathode-ray tube in a receiver 14 in front of an observer.

A manual control unit 15 gives the observer simultaneous adjustment of position and size of the image on his television screen. Initially, with the steerable reflector under radar control alone, maximum area coverage will be necessary to bring the image into view and hold it while tracking. The image will consequently be small and probably off-center. To expand the picture and retain the image, its centralization is first achieved by moving the hand control in the appropriate direction, thereby manually superimposing on to the servo-commands of the radar further servo-commands for the angular adjustment of the lane mirror. Then, by turning a knob or thumb-wheel incorporated in the manual control the height and width of the reproduced image are increased together to produce enlargement of the image, any further tendency for it to drift being corrected by manual re-positioning. The image enlargement is effected electronically by adjustment of the output of the receiver time bases.

To assist identification the dimensions of the target can be ascertained by comparison with a scale superimposed electronically on the display. The overall magnification is known, and range to the target, which is the only other parameter needed to generate scale markers, is available in the radar.

The focusing of the image from the parabolic mirror directly on to the camera tube, minimizes loss of light and enables a telescope of reasonable dimensions to combine suitable field, magnification, resolution and aperture. As an example, an 8-inch diameter mirror system of 60-inch focal length (f7.5) and a 1-inch Vidicon tube can produce a 66-line picture of a 100-foot object at 17 miles under a wide range of light conditions.

Although it will generally be preferable to slave the telescope to an airborne detection system where such a facility exists, self-contained means for finding and tracking the target can be provided. These could be based on infra-red sensing, automatic scanning and defocusing to give beam width.

FIGURE 2 shows a further form of the invention in which a laser is used to illuminate and possibly communicate with the craft to be identified.

In FIGURE 2 the laser 16 is located behind the parabolic mirror and likewise fixed in the airframe. Its characteristic narrow beam of coherent light (modulated or unmodulated), passes through a hole in the mirror along the path 17 which is parallel to the axis of the telescope and within the compass of its optical system. The latter will thus function simultaneously to aim the illuminating beam and to produce a visible image from the incoming target radiation. Centralization of the visible image in the manner previously described, with the additional assistance of cross-wires on the display, automatically adjusts the angle of the plane mirror to reflect the laser beam on to the target.

FIGURE 2 also shows the fixed optical axis 18 of the beam reflected from the plane mirror 6 and of the convergent beam reflected from the parabolic mirror 11; the link 19 between the manual control unit and the "magnification" circuits of the receiver 14; the link 20 between the manual control unit and the servo-mechanism 6 to permit manual adjustment of the angular position of the plane mirror 8; and the like 21 between the radar 4 and the receiver 14 to carry the range signals for providing scale markers on the display tube.

If desired, the television camera tube may be made to generate "off-center" error signals and these can be applied to the tracking servo-mechanism 6.

I claim:

1. An aircraft having in its airframe a window which is transparent to radiation from an object to be identified and having mounted within the airframe an angularly adjustable plane reflector which is arranged to reflect radiation passing through the window, tracking equipment for following the course of the object to be identified, a servo-mechanism controlled by the tracking equipment to steer the reflector through an angle which is half the relative angular movement of the object so that the beam of radiant energy received from the object is reflected along a fixed path within and relative to the airframe, a telescope fixed with respect to the airframe and having its optical axis coincident with the fixed radiation path established by the plane reflector and an electronic camera tube fixed with respect to the airframe and mounted with its photo-cathode in the focal plane of the telescope for providing a television signal representing an image of the object, and a receiver arranged for observation within the craft and connected by a closed circuit television link with the camera tube.

2. An aircraft according to claim 1, in which a radar supplies range-indicating signals to the receiver and the receiver electronically superimposes scale markers on the display.

3. An aircraft having an optically flat glass plate substantially flush with the surface of the aircraft body, an angularly adjustable plane reflector which is arranged to reflect radiation passing through the said glass plate, radar tracking equipment for following the course of the object to be identified, a servo mechanism controlled by the tracking equipment to steer the reflector so that radiation received from the object is reflected along a fixed path within and relative to the said aircraft body, a telescope fixed with respect to the airframe and having its optical axis coincident with the fixed path of reflected radiation established by the said reflector, the telescope including a parabolic mirror, an electronic camera tube fixed with respect to the said aircraft body and mounted with its photo-cathode in the focal plane of the parabolic mirror, for providing a television signal representing an image of the object, a television receiver arranged for observation within the craft, and closed circuit television link connecting the camera tube to the receiver, a manual control for centralizing the image of the object on the receiver, and manual means for controlling the electronic magnification of the image displayed by the receiver.

4. An aircraft according to claim 3, in which an aperture is provided in the parabolic mirror and in which a laser for illuminating the object to be identified transmits a beam through the said aperture onto the said reflector, whereby the object to be identified is illuminated by the laser beam.

References Cited by the Examiner
UNITED STATES PATENTS

| | | | |
|---|---|---|---|
| 2,705,319 | 3/1955 | Dauber | 95—12.5 X |
| 3,019,292 | 1/1962 | John | 95—12.5 X |
| 3,053,932 | 9/1962 | Worst | 343—6 |
| 3,211,046 | 10/1965 | Kennedy | 95—12.5 X |

CHESTER L. JUSTUS, *Primary Examiner.*

P. M. HINDERSTEIN, D. C. KAUFMAN, *Assistant Examiners.*